United States Patent
Sohn et al.

(10) Patent No.: US 9,382,386 B2
(45) Date of Patent: Jul. 5, 2016

(54) LACTIDE COPOLYMER, METHOD FOR PREPARING SAME, AND RESIN COMPOSITION COMPRISING SAME

(71) Applicant: LG CHEM, LTD., Seoul (KR)

(72) Inventors: Jung Min Sohn, Daejeon (KR); Seung Young Park, Daejeon (KR); Kyung Seog Youk, Daejeon (KR); Seung Ho Choi, Daejeon (KR)

(73) Assignee: LG Chem, Ltd, Seoul (KR)

( * ) Notice: Subject to any disclaimer, the term of this patent is extended or adjusted under 35 U.S.C. 154(b) by 0 days.

(21) Appl. No.: 14/434,613

(22) PCT Filed: Dec. 4, 2013

(86) PCT No.: PCT/KR2013/011172
§ 371 (c)(1),
(2) Date: Apr. 9, 2015

(87) PCT Pub. No.: WO2014/088321
PCT Pub. Date: Jun. 12, 2014

(65) Prior Publication Data
US 2015/0284516 A1    Oct. 8, 2015

(30) Foreign Application Priority Data

Dec. 6, 2012  (KR) .......... 10-2012-0141063
Dec. 4, 2013  (KR) .......... 10-2013-0149790

(51) Int. Cl.
| | | |
|---|---|---|
| C08F 283/00 | (2006.01) | |
| C08G 63/91 | (2006.01) | |
| C08G 81/00 | (2006.01) | |
| C08G 63/664 | (2006.01) | |
| C08G 18/48 | (2006.01) | |
| C08L 75/04 | (2006.01) | |
| C08J 5/18 | (2006.01) | |
| C08G 63/82 | (2006.01) | |

(52) U.S. Cl.
CPC .............. *C08G 81/00* (2013.01); *C08G 18/48* (2013.01); *C08G 63/664* (2013.01); *C08G 63/823* (2013.01); *C08J 5/18* (2013.01); *C08L 75/04* (2013.01); *C08J 2387/00* (2013.01)

(58) Field of Classification Search
CPC .............................. C08L 67/02; C09D 167/00
USPC ........................................................ 525/418
See application file for complete search history.

(56) References Cited

U.S. PATENT DOCUMENTS

| | | | |
|---|---|---|---|
| 4,826,945 A | 5/1989 | Cohn et al. | |
| 6,326,458 B1 | 12/2001 | Gruber et al. | |
| 2009/0247710 A1 | 10/2009 | De Vos | |
| 2012/0239161 A1* | 9/2012 | Datta ................... | A61L 27/18 |
| | | | 623/23.72 |

FOREIGN PATENT DOCUMENTS

| | | |
|---|---|---|
| CN | 102333785 A | 1/2012 |
| JP | 09143239 A | 6/1997 |
| JP | 11-35655 A | 2/1999 |
| JP | 11343325 A | 12/1999 |
| JP | 2000230029 A | 8/2000 |
| JP | 2005008897 A | 1/2005 |
| JP | 2009518129 A | 5/2009 |
| JP | 2009529068 A | 8/2009 |
| JP | 2009-203296 A | 9/2009 |
| JP | 2011-074333 A | 4/2011 |
| KR | 1019950702600 A | 7/1995 |
| KR | 1020010053259 A | 6/2001 |
| KR | 20100091092 A | 8/2010 |
| KR | 1020120049101 A | 5/2012 |
| KR | 1020120094552 A | 8/2012 |
| KR | 101191967 B1 | 10/2012 |
| KR | 20120135890 A | 12/2012 |
| WO | 2012/064043 A2 | 5/2012 |

* cited by examiner

*Primary Examiner* — Terressa Boykin
(74) *Attorney, Agent, or Firm* — Dentons US LLP

(57) ABSTRACT

The present invention relates to a lactide copolymer having excellent general physical properties such as mechanical physical properties, processability, and the like, and having excellent flexibility to be effectively usable as a packaging material, and the like, a preparing method thereof, and a resin composition including the same, wherein the lactide copolymer includes: two or more block copolymer repeating units in which hard segments of polylactide repeating units are bound to both ends of soft segments of polyether polyol repeating units, the block copolymer repeating units are linked with each other via a urethane linking group induced from a polyvalent isocyanate compound having more than 2 to less than 3 equivalents of an isocyanate group per a molecule, and the polyether polyol repeating unit has a number average molecular weight of 1000 to 10000.

16 Claims, 2 Drawing Sheets

LACTIDE COPOLYMER, METHOD FOR PREPARING SAME, AND RESIN COMPOSITION COMPRISING SAME

This application is a National Stage Application of International Application No. PCT/KR2013/011172, filed on Dec. 4, 2013, and claims the benefit of Korean Patent Application No. 10-2012-0141063, filed on Dec. 6, 2012 and Korean Patent Application No. 10-2013-0149790, filed on Dec. 4, 2013, all of which are hereby incorporated by reference in their entirety for all purposes as if fully set forth herein.

TECHNICAL FIELD

The present invention relates to a lactide copolymer, a preparing method thereof, and a resin composition including the same. More specifically, the present invention relates to a lactide copolymer having excellent general physical properties such as mechanical physical properties, processability, and the like, and having excellent flexibility to be effectively usable as a packaging material, and the like, a preparing method thereof, and a resin composition including the same.

BACKGROUND

A polylactide (or polylactic acid) resin is a kind of a resin including repeating units represented by General Formula below. Unlike existing crude oil-based resins, the polylactide resin is based on biomass, which is usable as a renewable resource, and less discharges $CO_2$ which is a global warming gas, in production, as compared to the existing resins, and has appropriate mechanical strength corresponding to the existing crude oil-based resin, together with eco-friendly characteristics such as biodegradability by moisture and microorganisms when being buried.

[General Formula]

As a preparing method of the polylactide resin, a method of directly polycondensing a lactic acid or a method of ring opening polymerizing a lactide monomer in the presence of an organic metal catalyst has been known. In the direct polycondensation among the methods, a viscosity is rapidly increased while processing the direct polycondensation, such that it is significantly difficult to effectively remove moisture which is a reaction by-product. Therefore, it is difficult to obtain a polymer having a high weight average molecular weight of one hundred thousand or more, such that it is difficult to sufficiently secure physical, mechanical physical properties of the polylactide resin. Meanwhile, since a lactide monomer is firstly prepared from a lactic acid in the ring opening polymerization method of the lactide monomer, a complicated preparation process and high cost are required as compared to polycondensation. However, a resin having a relatively large molecular weight may be relatively easily obtained by ring opening polymerization of lactide using the organic metal catalyst, and a polymerization rate may be easily controlled, which is commercially available.

The polylactide resin has been mainly used as disposable packaging/containers, coatings, foamings, films/sheets, fibers, and the like. Recently, an effort to mix the polylactide resin with existing resins such as acrylonitrile butadiene styrene (ABS), polycarbonate, polypropylene, and the like, to reinforce physical properties, thereby providing semi-permanent usages such as a cell phone exterior material, an automobile interior material, and the like, has been actively conducted. However, the polylactide resin has physical weaknesses such as hydrolysis due to factors such as a catalyst used at the time of preparing the polylactide resin, moisture in the air, and the like.

In particular, when the polylactide resin, the copolymer including the same, and the like, are processed as a film form and used as a disposable packaging material, the physical weaknesses such as fragility against impact and deteriorated flexibility may be obstacles to expansion to various markets.

SUMMARY OF INVENTION

The present invention provides a lactide copolymer having excellent general physical properties such as mechanical physical properties, processability, and the like, and having excellent flexibility to be effectively usable as a packaging material, and the like, and a preparing method thereof.

In addition, the present invention provides a resin composition including the lactide copolymer.

DESCRIPTION OF EMBODIMENTS

An exemplary embodiment of the present invention provides a lactide copolymer including:

two or more block copolymer repeating units in which hard segments of polylactide repeating units are bound to both ends of soft segments of polyether polyol repeating units, the block copolymer repeating unit being represented by Chemical Formula 1, wherein the block copolymer repeating units are linked with each other via a urethane linking group induced from a polyvalent isocyanate compound having more than 2 to less than 3 equivalents of an isocyanate group per a molecule, and the polyether polyol repeating unit has a number average molecular weight of 1000 to 10000:

[Chemical Formula 1]

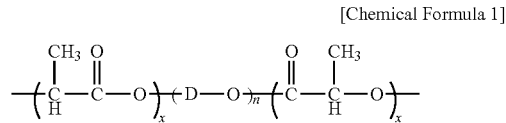

in Chemical Formula 1, D is a C2 to C10 linear or branched alkylene group, x is each independently an integer of 30 to 500, and n is an integer of 30 to 1000.

Another exemplary embodiment of the present invention provides a preparing method of the lactide copolymer as described above, including:

forming a block copolymer represented by Chemical Formula 1a by ring opening polymerization of a lactide monomer in the presence of a tin- or zinc-containing catalyst and an initiator including a polyether polyol polymer having a number average molecular weight of 1000 to 10000; and reacting the block copolymer represented by Chemical Formula 1a with a polyvalent isocyanate compound having more than 2 to less than 3 equivalents of an isocyanate group per a molecule:

[Chemical Formula 1a]

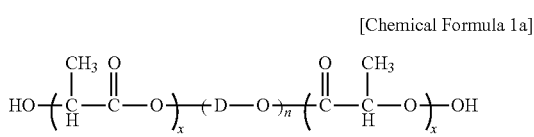

in Chemical Formula 1a, D is a C2 to C10 linear or branched alkylene group, x is each independently an integer of 30 to 500, and n is an integer of 30 to 1000.

In addition, another exemplary embodiment of the present invention provides a resin composition and a film including the lactide copolymer as described above.

Hereinafter, the lactide copolymer according to an exemplary embodiment of the present invention, a preparing method thereof, and a resin composition including the same are described in more detail.

According to an exemplary embodiment of the present invention, the lactide copolymer includes: two or more block copolymer repeating units in which hard segments of polylactide repeating units are bound to both ends of soft segments of polyether polyol repeating units, the block copolymer repeating unit being represented by Chemical Formula 1, wherein the block copolymer repeating units are linked with each other via a urethane linking group induced from a polyvalent isocyanate compound having more than 2 to less than 3 equivalents of an isocyanate group per a molecule, and the polyether polyol repeating unit has a number average molecular weight of 1000 to 10000:

[Chemical Formula 1]

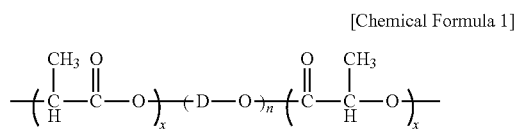

in Chemical Formula 1, D is a C2 to C10 linear or branched alkylene group, x is each independently an integer of 30 to 500, and n is an integer of 30 to 1000.

The lactide copolymer may include the block copolymer repeating units in which the hard segments of the polylactide repeating units are bound to the both ends of the soft segments of the polyether polyol repeating units derived from polyalkylene glycol, or the like, the block copolymer repeating units being represented by Chemical Formula 1.

In addition, the lactide copolymer may include two or more, that is, a plurality of the block copolymer repeating units linked with each other via a urethane linking group. More specifically, the urethane linking group is derived from the polyvalent isocyanate compound having more than 2 to less than 3 equivalents of an isocyanate group per a molecule, and includes more than 2 to less than 3 urethane bonds on average per one urethane linking group, the urethane bonds being obtained by a reaction of a terminal hydroxy group derived from the polylactide repeating unit and the isocyanate group derived from the polyvalent isocyanate compound.

According to a structure of the block copolymer repeating units of the lactide copolymer and the linking structure of these repeating units, the lactide copolymer may include a predetermined number of soft segments to exhibit excellent flexibility as compared to a polylactide resin or a lactide copolymer known in the art. In addition, the soft segments for improving flexibility may be bound in the lactide copolymer with the above-described link structure, which decreases a possibility in which the soft segments are discharged while being processed or used. Therefore, the lactide copolymer may exhibit and maintain excellent flexibility which is appropriate for being used as a packaging material, and the like.

Further, the urethane linking group includes more than 2 to less than 3 urethane bonds on average, such that the lactide copolymer may have both of linear and branched polymer chains. Accordingly, the lactide copolymer according to an exemplary embodiment of the present invention may simultaneously exhibit excellent melting processability and superior mechanical physical properties.

In addition, the lactide copolymer may be obtained by using a polyether polyol polymer having a number average molecular weight of about 1,000 to 10,000, or about 2,000 to 9,000, or about 3,000 to 8,000. Further, the polyether polyol polymer may have a molecular weight distribution (Mw/Mn) of about 1 to 3, or about 1 to 2, or about 1 to 1.5.

Accordingly, the block copolymer repeating unit and the lactide copolymer including the block copolymer repeating unit may include the polyether polyol repeating units having a number average molecular weight of about 1,000 to 10,000, or about 2,000 to 9,000, or about 3,000 to 8,000, and the corresponding molecular weight distribution as described above. As a result, the lactide copolymer may be easily prepared and provided so as to exhibit the above-described flexibility and to have a larger molecular weight. Therefore, the lactide copolymer according to an exemplary embodiment of the present invention may simultaneously satisfy excellent mechanical physical properties and flexibility, and the molecular weight and physical properties thereof may be easily controlled.

Eventually, the lactide copolymer according to an exemplary embodiment of the present invention may have excellent general physical properties such as mechanical physical properties, and the like, and may exhibit excellent flexibility to be effectively usable as packaging materials such as a packaging film, and the like.

Hereinafter, the lactide copolymer, the preparing method thereof, and the like, are described in more detail.

In the lactide copolymer according to an exemplary embodiment of the present invention, each of the block copolymer repeating units represented by Chemical Formula 1 above may have a weight average molecular weight of about 50,000 to 300,000, or about 70,000 to 200,000, and the lactide copolymer having the plurality of copolymer repeating units may have a weight average molecular weight of about 100,000 to 1,000,000, or about 100,000 to 500,000. The lactide copolymer has a large molecular weight as described above to exhibit and maintain excellent mechanical physical properties such as strength, and the like, and may be significantly preferably usable as various packaging materials.

In addition, the lactide copolymer includes the plurality of block copolymer repeating units including the hard segments of polylactide repeating units and the soft segments of polyether polyol repeating units, the block copolymer repeating unit being represented by Chemical Formula 1. In the block copolymer repeating unit, the soft segments of the polyether polyol repeating units may be a repeating unit derived from a polyether polyol polymer, for example, C2 to C8 polyalkylene glycol. More specifically, the polyether polyol repeating unit may be a polyalkylene glycol repeating unit selected from the group consisting of a polyethylene glycol (PEG) repeating unit, a poly(1,2-propylene glycol) repeating unit, a poly(1,3-propanediol) repeating unit, a polytetramethylene glycol repeating unit, and a polybutylene glycol repeating unit. Among them, the polyether polyol repeating unit is preferably a poly(propylene glycol) repeating unit in consideration of more excellent flexibility, mechanical physical properties, and the like, of the lactide copolymer according to an exemplary embodiment of the present invention.

Meanwhile, in the lactide copolymer, each of the block copolymer repeating units may include about 50 to 95 wt % or about 70 to 90 wt % of the hard segment and a residual amount of the soft segment, for example, about 5 to 50 wt % or about 10 to 30 wt % of the soft segment. If a content of the hard segment is extremely decreased, the lactide copolymer may have deteriorated mechanical physical properties such as strength, and the like, and on the contrary, if a content of the hard segment is extremely increased, or a content of the soft segment is extremely decreased, the lactide copolymer may have deteriorated flexibility, and therefore, the packaging material including the lactide copolymer may be easily torn by impact or it is difficult to use the packaging material including the lactide copolymer. In addition, if the content of the soft segment is extremely increased, mechanical physical properties may be significantly decreased due to degradation of the lactide copolymer. The reason is because the soft segment functions as a kind of initiator to promote depolymerization or degradation of the lactide copolymer, in particular the hard segment of the polylactide repeating unit.

In addition, the copolymer according to an exemplary embodiment of the present invention may include two or more block copolymer repeating units represented by Chemical Formula 1 as described above, and the block copolymer repeating units are linked with each other via a urethane linking group induced from the polyvalent isocyanate compound having more than 2 to less than 3 equivalents of an isocyanate group per a molecule (for example, which is formed by reaction of a terminal hydroxy group derived from the polylactide repeating unit and the polyvalent isocyanate compound). More specifically, the polyvalent isocyanate compound may be an isocyanate compound having more than about 2 to less than 3, or about 2.1 to 2.9, or about 2.2 to 2.8 equivalents of an average isocyanate group per a molecule.

Here, a compound having more than about 2 to less than 3 equivalents of an average isocyanate group per a molecule may include a mixture (for example, an equivalent of an average isocyanate group per a molecule=more than 2 to less than 3, or the like) of a diisocyanate compound having two isocyanate groups per a molecule (an equivalent of an average isocyanate group per a molecule=2) and a polyvalent isocyanate compound having 3 or more isocyanate groups per a molecule (an equivalent of an average isocyanate group per a molecule=3 or more). One urethane linking group derived from the polyvalent isocyanate compound may include both of a linear linking group including 2 urethane bonds and a branched linking group including 3 or more urethane bonds.

Therefore, the plurality of block copolymer repeating units included in the lactide copolymer may be linked with each other via the urethane linking group including the linear urethane linking group and the branched urethane linking group. Accordingly, the lactide copolymer according to an exemplary embodiment of the present invention may have a larger molecular weight and excellent mechanical physical properties accordingly. Further, due to the linking structure thereof, the molecular weight of the lactide copolymer, and the physical properties thereof accordingly may be easily controlled.

In particular, in the linking structure via the urethane linking group, the lactide copolymer includes the urethane linking groups having both structures rather than including only any one of the linear urethane linking structure or the branched urethane linking structure, such that the lactide copolymer may have both of more excellent processability and mechanical physical properties. That is, due to the linking structure, the lactide copolymer may include the linear copolymer chains and the branched copolymer chains at the same time. As a result, the lactide copolymer may have a larger molecular weight and high melting viscosity even at the same molecular weight, and therefore, more excellent mechanical physical properties and melting processability may be exhibited. When the urethane linking structure includes only the branched urethane linking groups (for example, the urethane linking group is induced from the polyvalent isocyanate compound having more than 3 equivalents of an average isocyanate group per a molecule), the lactide polymer may have extremely increased molecular weight, which forms a gel, and therefore, it is difficult to actually perform processes. On the contrary, when the urethane linking structure includes only the linear urethane linking groups (for example, the urethane linking group is induced from the diisocyanate compound having 2 equivalents of an average isocyanate group per a molecule), an effect of controlling the molecular weight due to the urethane linking may not be sufficient, which may have a negative effect on the processability and mechanical physical properties of the lactide copolymer.

Meanwhile, the polyvalent isocyanate compound forming the above-described urethane linking group may include a mixture of a diisocyanate compound and a polyvalent isocyanate compound having 3 or more equivalents of an isocyanate group, in order to satisfy the equivalent range of more than about 2 to less than 3 as described above.

Here, specific examples of the diisocyanate compound may include ethylene diisocyanate, 1,4-tetramethylene diisocyanate, 1,6-hexamethylene diisocyanate (HDI), 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate and naphthylene-1,5-diisocyanate, and the polyvalent isocyanate compound having 3 or more equivalents of the isocyanate group may be selected from the group consisting of an oligomer of the diisocyanate compound, a polymer of the diisocyanate compound, a cyclic polymer of the diisocyanate compound, hexamethylene diisocyanate isocyanurate, a triisocyanate compound and isomers thereof.

The polyvalent isocyanate compound satisfying the equivalent range of more than about 2 to less than 3 may be obtained by including two kinds or more selected from the diisocyanate compound/and or the polyvalent isocyanate compound having 3 or more equivalents at an appropriate ratio, and by using the polyvalent isocyanate compound, the urethane linking group linking the above-described block copolymer repeating units may be formed. As a result, as described above, the lactide copolymer according to an exemplary embodiment of the present invention may have higher molecular weight and excellent mechanical physical properties accordingly, appropriate melting viscosity, and improved processability.

Meanwhile, as described below in more detail, the lactide copolymer may be obtained by ring opening polymerization of a lactide monomer using a specific catalyst, in the presence of a macro initiator of the polymer consisting of the polyether polyol repeating units. The specific catalyst may be an organic metal composite represented by Chemical Formula 2 below or a catalyst including a mixture of a compound represented by Chemical Formula 3 below and a compound represented by Chemical Formula 4 below:

[Chemical Formula 2]

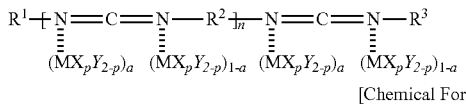

[Chemical Formula 3]

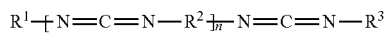

[Chemical Formula 4]

In Chemical Formula 2 to 4 above, n is an integer of 0 to 15, p is an integer of 0 to 2, M is Sn or Zn, $R^1$ and $R^3$ which may be the same as or different from each other are each hydrogen, substituted or unsubstituted C3 to C10 alkyl, substituted or unsubstituted C3 to C10 cycloalkyl, substituted or unsubstituted C6 to C10 aryl, $R^2$ is substituted or unsubstituted C3 to C10 alkylene, substituted or unsubstituted C3 to C10 cycloalkylene, substituted or unsubstituted C6 to C10 arylene, and X and Y are each independently an alkoxy group or a carboxyl group.

The hard segments may be formed by ring opening polymerization of the lactide monomer using the catalyst, and may be copolymerized with the soft segments derived from the macro-initiator to obtain the block copolymer repeating units, and the block copolymer repeating units may be linked with each other to prepare the copolymer according to an exemplary embodiment of the present invention.

However, the specific catalyst may have significantly excellent polymerization activity as compared to the existing materials, which allows the polylactide repeating unit having a large molecular weight to be prepared even with a small amount of the specific catalyst. Therefore, the lactide copolymer may have a large molecular weight of the hard segments and the soft segments and may have the above-described large weight average molecular weight due to the structure in which the block copolymer repeating units represented by Chemical Formula 1 above are linked with each other. Therefore, the lactide copolymer may exhibit excellent mechanical physical properties.

In addition, due to the excellent activity of the catalyst, the lactide copolymer may be prepared with a smaller amount of the catalyst, and a residual metal amount of the lactide copolymer, that is, tin or zinc residual metal amount derived from the catalyst may also be decreased to be about 20 ppm or less, or about 4 to 20 ppm. As a result, a possibility in which mechanical physical properties of the lactide copolymer are deteriorated by depolymerization or degradation of the residual catalyst (metal), and the like, may be significantly decreased, and a possibility of pollution or toxicity by the residual metal does not substantially exist.

In addition, at the time of using the composite catalyst represented by Chemical Formula 2 above, a content of the residual carbodiimide-based component derived from the catalyst, that is, a remaining component except for $MX_pY_{2-p}$, may be below about 0.2 wt %, or below about 0.15 wt %, and even at the time of using the mixture catalyst of Chemical Formula 3 and Chemical Formula 4, a content of the residual carbodiimide-based component represented by Chemical Formula 3 may be about 0.2 wt % or less, or about 0.15 wt % or less.

In addition, the lactide copolymer may include a residual lactide monomer having an amount of about 1.0 wt % or less, for example, about 0.8 wt % or less, based on a weight of the lactide copolymer.

As described above, the residual catalyst (metal, and the like) or the residual lactide monomer may have a low content, and a large molecular weight and excellent mechanical physical properties may be provided, such that the lactide copolymer may suppress decomposition or depolymerization during being processed or used, and may exhibit and maintain excellent mechanical physical properties such as strength, and the like. In addition, the pollution or toxicity caused by the residual catalyst or the monomer may also be minimized. As a result, the lactide copolymer may be significantly preferably used as various packaging materials.

In addition, the lactide copolymer may include tin or zinc residual metal derived from the catalyst as a catalyst form, that is, the organic metal composite represented by Chemical Formula 2 above or the residual catalyst form including the mixture of a compound represented by Chemical Formula 3 above and a compound represented by Chemical Formula 4, wherein $MX_pY_{2-p}$ of Chemical Formula 2 or $MX_pY_{2-p}$ of chemical Formula 4 may be tin(II) 2-ethyl hexanoate(Sn(Oct)$_2$).

The above-described lactide copolymer includes two or more of the block copolymer repeating units including the hard segment-soft segment-hard segment consisting of the polylactide repeating unit-the polyether polyol repeating unit-the polylactide repeating unit to exhibit specific biodegradability of a biomass-based resin. In addition, since the lactide copolymer includes a structure in which the block copolymer repeating units are linked with each other via a predetermined number of urethane linking groups, it is easy to control the molecular weight of the resin. Therefore, the lactide copolymer may exhibit more improved mechanical physical properties due to a high molecular weight. In addition, the lactide copolymer has the linking structure via the specific urethane linking group to simultaneously satisfy an appropriate melt index, and excellent processability.

Further, the lactide copolymer may include the soft segments of polyether polyol repeating units to exhibit remarkably improved flexibility (for example, high elongation) and excellent transparency property.

Therefore, the above-described lactide copolymer may be preferably used as packaging materials of various fields, including food packaging materials (film, and the like).

Meanwhile, according to another exemplary embodiment, there is provided the preparing method of the above-described lactide copolymer. The preparing method may include: forming a block copolymer represented by Chemical Formula 1a by ring opening polymerization of a lactide monomer in the presence of a tin- or zinc-containing catalyst and an initiator including a polyether polyol polymer having a number average molecular weight of about 1000 to 10000; and reacting the block copolymer represented by Chemical Formula 1a with a polyvalent isocyanate compound having more than 2 to less than 3 equivalents of an isocyanate group per a molecule:

[Chemical Formula 1a]

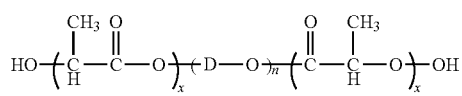

in Chemical Formula 1a, D is a C2 to C10 linear or branched alkylene group, x is each independently an integer of 30 to 500, and n is an integer of 30 to 1000.

According to the preparing method, in a first step, the hard segments of polylactide repeating units may be formed and bound to the soft segments derived from the initiator of the polyether polyol polymer having a predetermined number of number average molecular weight, thereby preparing the block copolymer represented by Chemical Formula 1a, and in a second step, the block copolymer may be bound to the polyvalent isocyanate compound to prepare the above-described lactide copolymer.

Here, the polyether polyol copolymer functions as a kind of macro-initiator at the time of forming the polylactide repeating unit which is the hard segment. That is, the macro-initiator may be bound to the lactide monomer with the organic metal catalyst to initiate the ring opening reaction, and the chains may be continuously extended to form the hard segments and the block copolymer including the same. That is, since the hydroxy groups at both ends of the polyether polyol polymer serve to initiate the ring opening polymerization and extend the chains, the block copolymer formed therefrom may have a structure in which the hard segments are bound to both ends of the polyether polyol polymer, that is, the soft segment.

Therefore, the block copolymer formed as described above may react with the polyvalent isocyanate compound to prepare the lactide copolymer according to an exemplary embodiment of the present invention.

In the preparing method, the tin- or zinc-containing catalyst may be the organic metal composite represented by Chemical Formula 2 or the catalyst including the mixture of a compound represented by Chemical Formula 3 and a compound represented by Chemical Formula 4. By using the specific catalyst, the lactide copolymer prepared according to another exemplary embodiment of the present invention may satisfy a low content of the residual metal and a high molecular weight, and may achieve excellent general physical properties. As a result, the lactide copolymer may have a large molecular weight and excellent mechanical physical properties obtained from the large molecular weight as compared to the related art, and have a low content of the residual metal to suppress degradation, thereby exhibiting hydrolysis resistance and thermal resistance. The reason is because the catalyst exhibits excellent polymerization activity as compared to the existing catalysts to prepare the hard segment and the lactide copolymer having the large molecular weight even with a small amount of the used catalyst.

That is, due to excellent activity of the catalyst, the lactide copolymer having a larger molecular weight may be prepared even with a small amount of catalyst, and may also be obtained in a state in which depolymerization or degradation is suppressed during polymerization or after the polymerization. Therefore, since the amount of the monomer and the catalyst remaining in the lactide copolymer after the polymerization may be minimized, more excellent mechanical physical properties may be exhibited, and excellent hydrolysis resistance may be exhibited under high temperature and high moisture conditions.

In addition, the lactide copolymer has acidity lower than that of the previously known lactide copolymers. Therefore, degradation or a decrease in a molecular weight of the lactide copolymer or the product obtained therefrom may be prevented, such that more improved hydrolysis resistance or thermal resistance may be exhibited. In addition, mechanical and physical properties of the lactide copolymer may be excellently maintained.

Non-limited principles and reasons thereof are described as follows.

In the preparing method of the lactide (co)polymer, for example, tin- or zinc-containing catalyst for ring opening polymerization is used, wherein a portion of the catalyst unavoidably remains in the finally prepared (co)polymer. However, the remaining catalyst may be bound to ends of the (co)polymer, and this composite and a carboxylic acid, and the like, may generate a trans-esterification reaction, and the like, which may cause degradation and a decrease in molecular weight of the (co)polymer. In addition, the remaining lactide monomer may be easily hydrolyzed under high temperature and high moisture conditions to generate the carboxylic acid and promote hydrolysis of the (co)polymer, thereby causing the decrease in a molecular weight.

Meanwhile, as described above, the lactide copolymer prepared as described above may have a low content of the remaining metal derived from the catalyst and a low content of the remaining lactide monomer, and may have a high molecular weight. Therefore, degradation or the decrease in a molecular weight caused by the remaining metal or the remaining lactide monomer may be minimized, and excellent mechanical physical properties due to the high molecular weight may be exhibited and maintained.

Meanwhile, in the above-described preparing method of the lactide copolymer, L-lactide or D-lactide which is a cyclic monomer obtained from L-polylactic acid or D-polylactic acid may be used as the lactide monomer. More preferably, as the lactide monomer, it is preferable to use L-lactide or D-lactide raw materials having an optical purity of 98% or more in view of a melting temperature and thermal resistance of the lactide copolymer.

In addition, as the polyether polyol polymer, C2 to C8 polyalkylene glycol having a number average molecular weight of about 1,000 to 10,000, or about 2,000 to 9,000, or about 3,000 to 8,000, and a molecular weight distribution (Mw/Mn) of about 1 to 3, or about 1 to 2, or about 1 to 1.5 may be used, and specifically, may be polyalkylene glycol selected from the group consisting of polyethylene glycol (PEG), poly (1,2-propylene glycol), poly(1,3-propanediol), and polytetramethylene glycol, and polybutylene glycol. Among them, poly(propyleneglycol) may be properly used in consideration of more excellent flexibility and mechanical physical properties of the finally prepared lactide copolymer.

In addition, the ring opening polymerization may be performed at a temperature of about 120 to 200° C., or about 120 to 190° C. for about 0.5 to 8 or about 1 to 7 hours.

Further, the composite represented by Chemical Formula 2 or the mixture of Chemical Formulas 3 and 4 may be used as the catalyst in the ring opening polymerization, wherein the catalyst may be used as a ratio of about 1:10,000 to 1:200,000 (mole/mole ratio) based on the lactide monomer. If an addition ratio of the catalyst is extremely decreased, the polymerization activity is not sufficient which is not preferable, and on the contrary, if an addition ratio of the catalyst is extremely increased, the residual catalyst amount of the prepared lactide copolymer is increased, which may cause degradation or decrease in a molecular weight of the copolymer.

In addition, the ring opening polymerization reaction is preferably bulk polymerization in which a solvent is substantially not used. Here, the matter in which the solvent is substantially not used may include a case of using a small amount of solvent for dissolving the catalyst, for example, a solvent having the maximum amount of less than about 1 ml per 1 kg of the used lactide monomer.

As the ring opening polymerization is performed as the bulk polymerization, a process for removing the solvent after the polymerization may be omitted and degradation or loss of the copolymer in the process of removing the solvent may be suppressed. In addition, the lactide copolymer may be obtained by the bulk polymerization with a high conversion ratio and a yield.

Further, in the step of reacting the block copolymer with the polyvalent isocyanate compound after the ring opening polymerization, an isocyanate compound having more than about 2 to less than 3 equivalents of an isocyanate group may be used as the polyvalent isocyanate compound, which is the same as described above, and therefore, more details thereof will be omitted.

Further, the polyvalent isocyanate compound may be used in an amount of about 0.05 to 5 parts by weight, or about 0.1 to 4 parts by weight, or about 0.2 to 2 parts by weight based on 100 parts by weight of the block copolymer represented by Chemical Formula 1a above. When the amount of the used polyvalent isocyanate compound is extremely decreased, the molecular weight, the viscosity or the mechanical physical properties of the lactide copolymer may not be sufficiently obtained, and on the contrary, when the amount thereof is extremely increased, gel may be formed due to the excessively increased molecular weight of the lactide copolymer.

Further, the reaction with the polyvalent isocyanate compound may be performed at a temperature of about 100 to 190° C. for about 0.001 to 1 hour. However, the reaction condition is not specifically limited as long as it is general reaction conditions forming the urethane bond.

In addition, the reaction with the polyvalent isocyanate compound may be performed in the presence of a tin-based catalyst. Representative examples of the tin-based catalyst may include stannous octoate, dibutyltin dilaurate, dioctyltin dilaurate, and the like.

According to the preparing method, the lactide copolymer having excellent mechanical physical properties, flexibility, processability, and the like, due to predetermined structural properties, a high molecular weight, an appropriate melt index, and the like, for example, the lactide copolymer according to an exemplary embodiment of the present invention, may be prepared at a high conversion rate.

Meanwhile, there is provided a resin composition including the above-described lactide copolymer according to another exemplary embodiment of the present invention.

The resin composition includes the lactide copolymer exhibiting excellent mechanical physical properties, flexibility, hydrolysis resistance, thermal resistance, and the like, to exhibit excellent physical and mechanical properties, which is preferably used with semi-permanent usages such as food packaging films, sheets, flooring materials, electronic product packaging, car interior materials, and the like.

In addition, the resin composition may further include various existing additives included in various resin compositions.

Further, the resin composition may be prepared as a liquid-phase or a solid-phase resin composition before molding a final product, or may be a plastic, a fiber, and the like, in a final product state, wherein the final plastic or fiber product, and the like, may be prepared by general methods according to each product type.

In particular, when the above-described resin composition is molded as the film, the manufactured film may have excellent transparency, and in particular, a low content of residual metals to decrease toxicity and significantly improve flexibility, which may be effectively used as a food packaging film, as compared to the related art. Therefore, the packaging film may be preferably applied as packaging materials of various fields. For example, the film prepared by using the lactide copolymer according to the present invention may be widely used as industrial packaging materials such as agricultural mulching film, automotive protective coating film sheets, garbage bags, compost pockets, and the like, as well as living consumer goods, or grocery packaging papers/bags, chilled/frozen food packaging, shrinkable over-wrapping films, films for bundle, personal hygiene films such as sanitary pads or baby products, lamination films, and mat films for shrinkable label packaging and snack packing.

Advantageous Effects

The lactide copolymer according to the present invention may exhibit excellent flexibility, thermal resistance, and processability while expressing and maintaining excellent mechanical physical properties, and may have few pollution or toxicity caused by residual catalysts and monomers. Therefore, the lactide copolymer may be preferably applied as various packaging materials such as a food packaging material, and the like.

In particular, the film including the lactide copolymer may be preferably applied to a food packaging product, and may be used as materials of various fields which are semi-permanently used, such as electronic product packaging or interior materials for vehicle as well as disposable products such as films and sheets for household.

EXAMPLES

Figure 1:
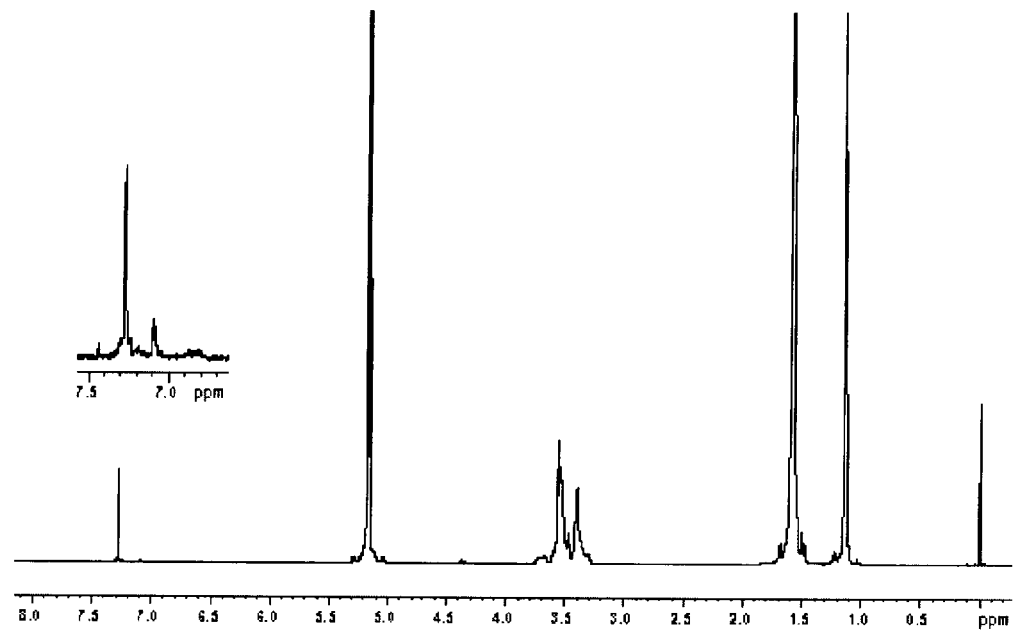
FIG. 1 illustrates $^1$H NMR spectrum of a lactide copolymer of Example 5.

Hereinafter, functions and effects of the present invention will be described in detail by specific examples of the present invention. Meanwhile, the Examples are provided only to illustrate the present invention, and the scope of the invention is not limited thereto.

[Experimental Method]

In the following Examples and Comparative Examples, all operations dealing with compounds sensitive to air or water were carried out using standard Schlenk technique or dry box techniques.

In addition, definition and measuring methods of each physical property in Examples to be described below are summarized below.

(1) Content (wt %) of Polylactide and Polyether Polyol Repeating Units: Contents of each repeating unit in the block copolymer repeating units included in each prepared lactide copolymer are weighed through $^1$H NMR using 600 Mhz nuclear magnetic resonance (NMR) spectrometer.

(2) Tg and Tm (° C.): By using a differential scanning calorimeter (manufactured by TA Instruments), samples were melted and rapidly cooled and then Tg and Tm thereof were measured while increasing a temperature at 10° C./min. A mid value of a baseline and each tangent around an endothermic curve was determined as Tg and a max value temperature of a melting endothermic peak of a crystal was determined as Tm.

(3) Molecular Weight and Molecular Weight Distribution: A molecular weight and a molecular weight distribution of the polymer were measured by using gel permeation chromatography (GPC), wherein a polystyrene sample was used as a standard one.

(4) Residual Lactide Content (wt %): A content of residual lactide included in the lactide copolymer are weighed through $^1$H NMR using 600 Mhz nuclear magnetic resonance (NMR) spectrometer based on the lactide copolymer.

Synthesis Example 1

Sn(Oct)2 (Aldrich) (0.2 g, 0.49 mmol) and a compound represented by Chemical Formula 5 below (TCI) (0.36 g, 1.0 mmol) were put into a 100 mL flask, respectively, 30 mL of toluene was put thereinto, and stirred at 100° C. for 1 hour. Then, after a solvent was removed under vacuum, the obtained product was washed with a heptane solvent and dried to obtain 0.36 g of an organic metal composite A.

[Chemical Formula 5]

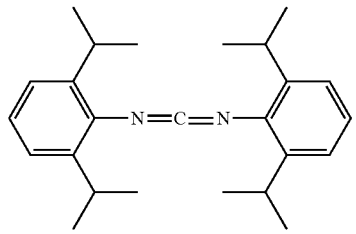

Synthesis Example 2

Sn(Oct)$_2$ (Aldrich) (0.2 g, 0.49 mmol) and a compound represented by Chemical Formula 6 below (LineChemi) (0.36 g) were put into a 100 mL flask, respectively, to obtain 0.4 g of an organic metal composite B by the same method as Synthesis Example 1.

Referring to $^{13}$C NMR spectrum with respect to the organic metal composite B, three carbonyl peaks in the reaction of the Sn(Oct)$_2$ catalyst and the compound represented by Chemical Formula 6 were shown at δ188, 183, and 182 ppm, wherein the significantly sharp peak shown at δ183 corresponds to Oct-H acid compound bound to the compound represented by Chemical Formula 6, the wide peak shown at δ188 ppm corresponds to free Sn(Oct)$_2$, and the wide peak shown at δ182 ppm corresponds to the organic metal composite having the coordinated compound represented by Chemical Formula 6:

[Chemical Formula 6]

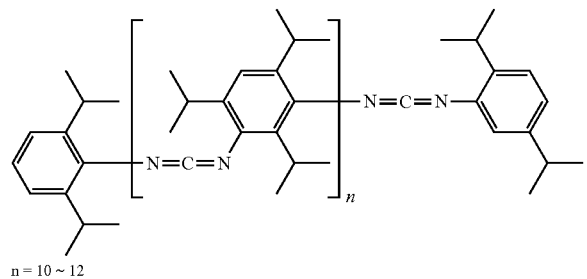

n = 10 ~ 12

Example 1

An L-lactide monomer (100 kg, 693.82 mol) and the organic metal composite A (102.81 g) prepared in Synthesis Example 1 were put into a 150 L reactor provided with a nitrogen-introducing tube, a stirrer, a catalyst inlet and a vacuum system, then polypropylene glycol (a number average molecular weight of 4,000 g/mol, molecular weight distribution: 1.2, 5.26 kg) was put thereinto, followed by ring opening polymerization at a temperature of 180° C. for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 110,000.

Then, about 0.4 wt % of the polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule, with respect to the block copolymer represented by Chemical Formula 1a above was put into a polymerization reactor, followed by an additional polymerization reaction with the block copolymer represented by Chemical Formula 1a at a temperature of 180° C. for 10 minutes to form a urethane linking group.

After the reaction was completed, residual lactide was removed by general volatilization process to prepare a lactide copolymer including two or more of the block copolymer repeating units represented by Chemical Formula 1. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 1 below.

Example 2

A lactide copolymer of Example 2 was prepared by the same method as Example 1 except that polypropylene glycol (a number average molecular weight of 4,000 g/mol, a molecular weight distribution of 1.2) was used in an amount of 11.11 kg rather than 5.26 kg, and the isocyanate compound was used in an amount of 0.5 wt %. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 1 below.

Example 3

A lactide copolymer of Example 3 was prepared by the same method as Example 1 except that polypropylene glycol (a number average molecular weight of 6,000 g/mol and a molecular weight distribution of 1.3) was used in an amount of 5.26 kg, and the isocyanate compound was used in an amount of 0.3 wt %. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 1 below.

Example 4

A lactide copolymer of Example 4 was prepared by the same method as Example 1 except that polypropylene glycol (a number average molecular weight of 6,000 g/mol and a molecular weight distribution of 1.3) was used in an amount of 11.11 kg rather than 5.26 kg. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 1 below.

Example 5

A lactide copolymer of Example 5 was prepared by the same method as Example 2 except that polypropylene glycol (a number average molecular weight of 6,000 g/mol and a molecular weight distribution of 1.3) was used in an amount of 17.65 kg rather than 5.26 kg. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 1 below. In addition, $^1$H NMR spectrum of the lactide copolymer of Example 1 is shown in FIG. 1.

Comparative Example 1

A lactide copolymer of Comparative Example 1 was prepared by the same method as Example 1 except that the polypropylene glycol and the isocyanate compound were not used. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 2 below.

Comparative Example 2

A lactide copolymer of Comparative Example 2 was prepared by the same method as Example 2 except that polypropylene glycol (a number average molecular weight of 500 g/mol) was used in an amount of 17.65 kg. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 2 below.

Comparative Example 3

An L-lactide monomer (2 g, 13.9 mmol) and the organic metal composite A (0.14 mg) prepared in Synthesis Example 1 were put into a 20 mL reactor provided with a nitrogen-introducing tube, a stirrer, a catalyst inlet and a vacuum system, then polypropylene glycol (a number average molecular weight of 12,000 g/mol, 0.35 g) was put thereinto, followed by ring opening polymerization at a temperature of 180° C. for 3 hours, to prepare a block copolymer represented by Chemical Formula 1a.

Then, about 0.5 wt % of the polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule, with respect to the block copolymer represented by Chemical Formula 1a above was put into a polymerization reactor, and followed by an additional polymerization reaction with the block copolymer represented by Chemical Formula 1a at a temperature of 180° C. for 30 minutes to form a urethane linking group.

After the reaction was completed, residual lactide was removed by general volatilization process to prepare a lactide copolymer including two or more of the block copolymer repeating units represented by Chemical Formula 1, and then a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 2 below.

Comparative Example 4

A lactide copolymer of Comparative Example 4 was prepared by the same method as Example 1 except that the MDI having 2.0 equivalents of an isocyanate group was only used and the polyvalent isocyanate compound having about 2.7 equivalents of an average isocyanate group per a molecule was not used. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 2 below.

Comparative Example 5

A lactide copolymer of Comparative Example 5 was prepared by the same method as Example 1 except that the hexamethylene diisocyanate isocyanurate having 3.0 equivalents of an average isocyanate group per a molecule was only used and the polyvalent isocyanate compound having about 2.7 equivalents of an average isocyanate group per a molecule was not used. Then, a weight average molecular weight, a polydispersity index (PDI), a glass transition temperature, a melting temperature with respect to the prepared lactide copolymer, and a content of the hard segment (a content of the polylactide repeating unit) and a content of the soft segment (a content of the polypropylene glycol repeating unit) of the block copolymer repeating unit derived from the block copolymer represented by Chemical Formula 1a were measured, and the results thereof were shown in Table 2 below.

TABLE 1

|  | Example 1 | Example 2 | Example 3 | Example 4 | Example 5 |
|---|---|---|---|---|---|
| Mw (g/mol) | 210,000 | 220,000 | 200,000 | 190,000 | 180000 |
| PDI (Mw/Mn) | 2.5 | 2.8 | 2.2 | 2.4 | 2.9 |
| Tg (° C.) | 56.8 | 53.2 | 55.5 | 46.7 | 43.3 |
| Tm (° C.) | 169.7 | 167.8 | 168.8 | 169.1 | 168.1 |
| Content (wt %) of Hard Segment | 95 | 90 | 95 | 90 | 85 |
| Content (wt %) of Soft Segment | 5 | 10 | 5 | 10 | 15 |

TABLE 2

|  | Comparative Example 1 | Comparative Example 2 | Comparative Example 3 | Comparative Example 4 | Comparative Example 5 |
|---|---|---|---|---|---|
| Mw (g/mol) | 234000 | 50000 | 290,000 | 110,000 | — |
| PDI (Mw/Mn) | 1.9 | — | 2.8 | 2.4 | — |
| Tg (° C.) | 60.3 | — | 59.8 | 54.5 | 62.1 |
| Tm (° C.) | 165.3 | — | 168.3 | 160.1 | 169.5 |
| Content (wt %) of Hard Segment | 100 | 85 | 85 | 95 | 95 |
| Content (wt %) of Soft Segment | 0 | 15 | 15 | 5 | 5 |

Referring to Table 1 above, it was confirmed that the lactide copolymers of Examples 1 to 5 had a high molecular weight and excellent mechanical physical properties accordingly. In addition, the lactide copolymers of Examples 1 to 5 had a relatively low glass transition temperature, and therefore, it is expected that the lactide copolymers had excellent flexibility.

Meanwhile, the copolymers of Comparative Examples 1 to 3 exhibited a high glass transition temperature and poor flexibility, and the copolymer of Comparative Example 2 had an extremely low molecular weight, which causes significantly deteriorated mechanical physical properties. In addition, the copolymer of Comparative Example 2 had an extremely low molecular weight, which is difficult to measure physical properties such as a glass transition temperature, a melting temperature, and the like. In addition, the copolymer of Comparative Example 3 had an extremely high molecular weight of polypropylene glycol, which was not capable of being polymerized for mass production scale, and could be capable of being polymerized only for significantly small polymerization scale (a reactant having an amount for LAB scale was used) as compared to Examples 1 to 5 and Comparative Examples 1 and 2.

Further, the lactide copolymer of Comparative Example 4 had a low molecular weight, such that mechanical physical properties were not sufficiently provided, and the lactide copolymer of Comparative Example 5 had a large amount of gel, such that analysis and processing could not be performed.

Experimental Example 1

Measurement of Mechanical Physical Properties

Samples for measuring tensile strength were manufactured by applying an injection molder (HAAKE Minijet II) to the copolymers of Examples 1 to 5 and Comparative Examples 1 to 5. Samples were manufactured at 200° C. and mechanical physical properties of each sample were measured. The evaluation results were summarized and shown in Tables 3 and 4 below.

Mechanical physical properties of the samples were measured and evaluated by the following methods.

(1) Tensile Strength (kgf/cm$^2$): Tensile strength of the manufacture samples were measured by using an Universal Testing Machine (UTM) (manufactured by Instron) according to ASTM D 882. An average value of total values obtained by performing the measuring experiment 5 times was represented as a result value.

(2) Elongation (%): An elongation when the sample was cut was measured under the same condition as (1) tensile strength above and an average value of total values obtained by performing the measuring experiment 5 times was represented as a result value.

Figure 2:
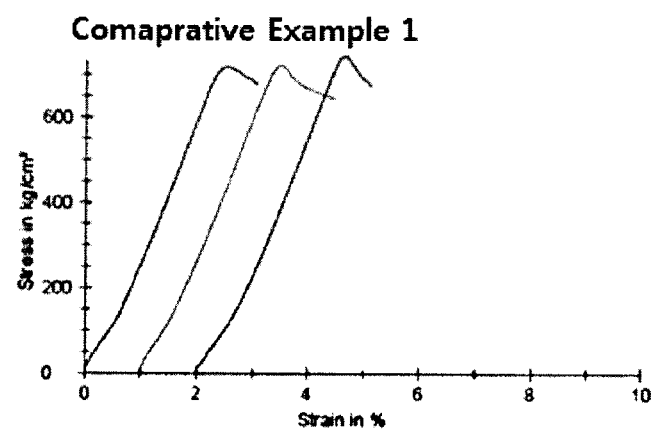
FIG. 2 illustrates a strain-stress curve of a lactide copolymer of Comparative Example 1.
Figure 3:
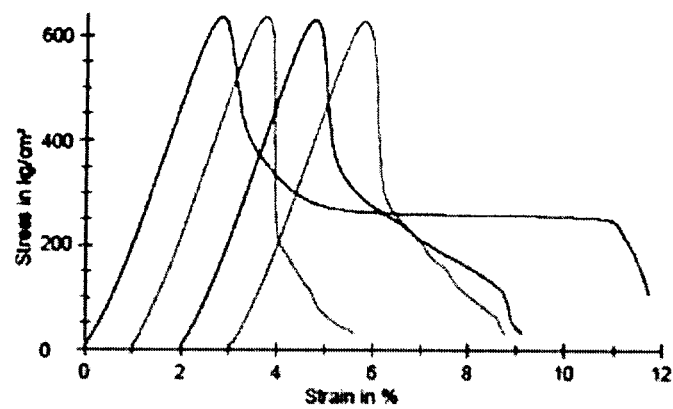
FIGS. 3 and 4 illustrate strain-stress curves of lactide copolymers of Examples 3 and 4.
Figure 4:
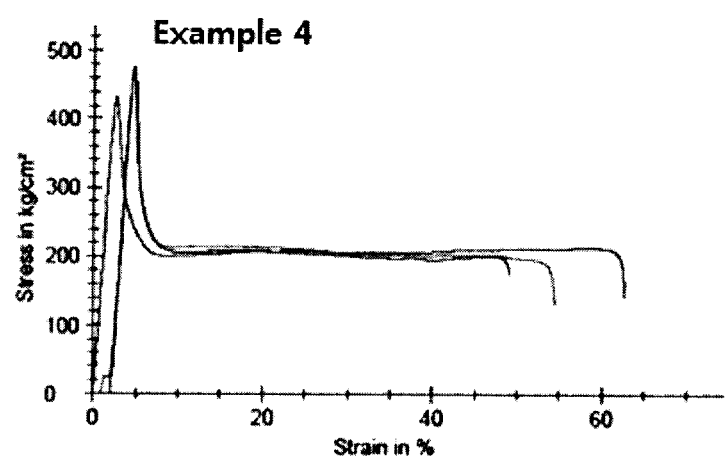

(3) Stress-strain curve and modulus (GPa): A stress-strain curve shown at the time of measuring tensile strength of the sample was deduced by using UTM. A slope at a section from an initial strain 0 to 1% strain on the stress-strain curve was calculated to obtain modulus. Each stress-strain curve of Comparative Example 1, Examples 3 and 4 is shown in FIGS. 2 to 4.

TABLE 3

|  | Example 1 | Example 2 | Example 3 | Example 4 | Example 5 |
|---|---|---|---|---|---|
| Tensile Strength | 512 | 451 | 631 | 540 | 354 |
| Elongation | 5.2 | 10.1 | 5.8 | 54.3 | 61.6 |
| Modulus | 1.75 | 1.67 | 1.81 | 1.83 | 1.75 |

TABLE 4

| | Comparative Example 1 | Comparative Example 2 | Comparative Example 3 | Comparative Example 4 | Comparative Example 5 |
|---|---|---|---|---|---|
| Tensile Strength | 729 | — | — | 200 | — |
| Elongation | 3.2 | — | — | 2.5 | — |
| Modulus | 1.94 | — | — | 1.91 | — |

Referring to Tables 3 and 4, and FIGS. 2 to 4, it was confirmed that the lactide copolymers prepared by Examples had the same tensile strength as or more excellent tensile strength than those of Comparative Examples, and had high elongation and low modulus to exhibit improved flexibility as compared to Comparative Examples. Meanwhile, it was confirmed that the copolymer of Comparative Example 1 had a significantly low elongation, which causes poor flexibility, and the copolymer of Comparative Example 2 had an extremely low molecular weight, which was difficult to measure mechanical physical properties. In addition, in Comparative Example 3, it was difficult to secure the sample in a sufficient amount required for measuring physical properties, and therefore, the measurement was not possible.

In addition, it was confirmed that the copolymer of Comparative Example 4 exhibited poor mechanical physical properties as described above. In the copolymer of Comparative Example 5, processing of the sample required for measuring the mechanical physical properties was not possible.

The invention claimed is:

1. A lactide copolymer comprising:
two or more block copolymer repeating units in which hard segments of polylactide repeating units are bound to both ends of soft segments of polyether polyol repeating units, the block copolymer repeating unit being represented by Formula 1,
wherein the block copolymer repeating units are linked with each other via a urethane linking group induced from a polyvalent isocyanate compound having more than 2 to less than 3 equivalents of an isocyanate group per molecule, and
the polyether polyol repeating unit has a number average molecular weight (Mn) of 1000 to 10000:

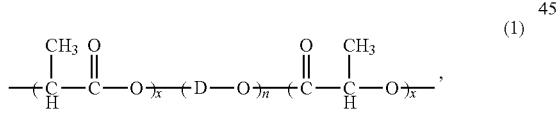

and wherein in Formula 1, D is a C2 to C10 linear or branched alkylene group, x is each independently an integer of 30 to 500, and n is an integer of 30 to 1000.

2. The lactide copolymer of claim 1, wherein it has a weight average molecular weight (Mw) of 100,000 to 1,000,000.

3. The lactide copolymer of claim 1, wherein each of the block copolymer repeating units has a weight average molecular weight (Mw) of 50,000 to 300,000.

4. The lactide copolymer of claim 1, wherein the polyvalent isocyanate compound includes a mixture of a diisocyanate compound and a polyvalent isocyanate compound having 3 or more equivalents of an isocyanate group.

5. The lactide copolymer of claim 4, wherein the diisocyanate compound is selected from the group consisting of ethylene diisocyanate, 1,4-tetramethylene diisocyanate, 1,6-hexamethylene diisocyanate (HDI), 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate and naphthylene-1,5-diisocyanate, and the polyvalent isocyanate compound having 3 or more equivalents of the isocyanate group is selected from the group consisting of an oligomer of the diisocyanate compound, a polymer of the diisocyanate compound, a cyclic polymer of the diisocyanate compound, hexamethylene diisocyanate isocyanurate, a triisocyanate compound and isomers thereof.

6. The lactide copolymer of claim 1, wherein the urethane linking group includes urethane bonds obtained by a reaction of a terminal hydroxy group derived from the polylactide repeating unit and the isocyanate group derived from the polyvalent isocyanate compound.

7. The lactide copolymer of claim 1, wherein two or more block copolymer repeating units include 50 to 95 wt % of the hard segment and 5 to 50 wt % of the soft segment with respect to the total weight.

8. A preparing method of the lactide copolymer of claim 1, comprising:
forming a block copolymer represented by Formula 1a by ring opening polymerization of a lactide monomer in the presence of a tin- or zinc-containing catalyst and an initiator including a polyether polyol polymer having a number average molecular weight (Mn) of 1000 to 10000; and
reacting the block copolymer represented by Formula 1a with a polyvalent isocyanate compound having more than 2 to less than 3 equivalents of an isocyanate group per a molecule:

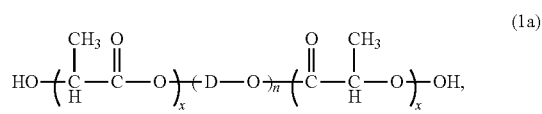

and wherein in Formula 1a, D is a C2 to C10 linear or branched alkylene group, x is each independently an integer of 30 to 500, and n is an integer of 30 to 1000.

9. The preparing method of claim 8, wherein the tin- or zinc-containing catalyst includes an organic metal composite represented by Formula 2 or a mixture of a compound represented by Formula 3 and a compound represented by Formula 4:

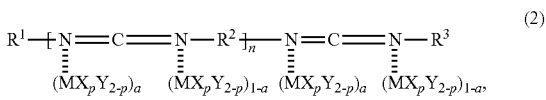

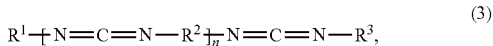

and wherein in Formula 2 to 4, n is an integer of 0 to 15, p is an integer of 0 to 2, M is Sn or Zn, $R^1$ and $R^3$ which may be the same as or different from each other are each hydrogen, substituted or unsubstituted C3 to C10 alkyl, substituted or unsubstituted C3 to C10 cycloalkyl, substituted or unsubstituted C6 to C10 aryl, $R^2$ is substituted or unsubstituted C3 to C10 alkylene, substituted or unsubstituted C3 to C10 cycloalkylene, substituted or unsubstituted C6 to C10 arylene, and X and Y are each independently an alkoxy group or a carboxyl group.

10. The preparing method of claim 8, wherein the ring opening polymerization is performed at a temperature of 120 to 200° C. for 0.5 to 8 hours.

11. The preparing method of claim 8, wherein the polyvalent isocyanate compound is used in an amount of 0.05 to 5 parts by weight based on 100 parts by weight of the block copolymer represented by Formula 1a.

12. The preparing method of claim 8, wherein the reacting of the block copolymer with a polyvalent isocyanate compound is performed at a temperature of 100 to 190° C. for 0.001 to 1 hour.

13. The preparing method of claim 8, wherein the reacting of the block copolymer with a polyvalent isocyanate compound is performed in the presence of a tin-based catalyst.

14. A resin composition comprising the lactide copolymer of claim 1.

15. A film comprising the lactide copolymer of claim 1.

16. The film of claim 15, wherein it is used as a packaging film.

\* \* \* \* \*